(No Model.) 2 Sheets—Sheet 1.
L. MELLETT.
ELECTRICAL ORE DETECTOR.
No. 367,422. Patented Aug. 2, 1887.
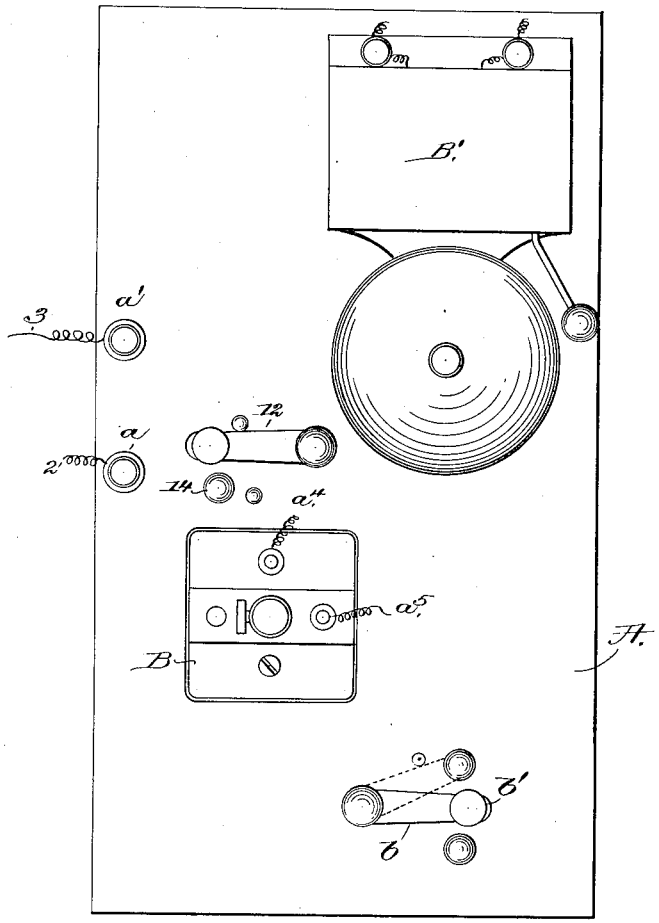
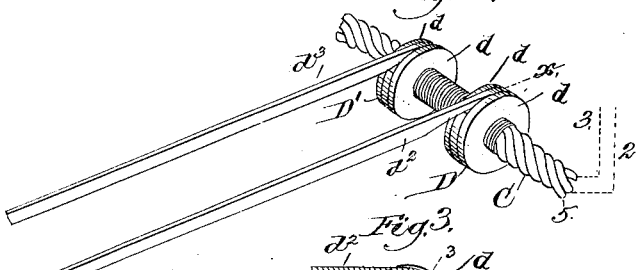

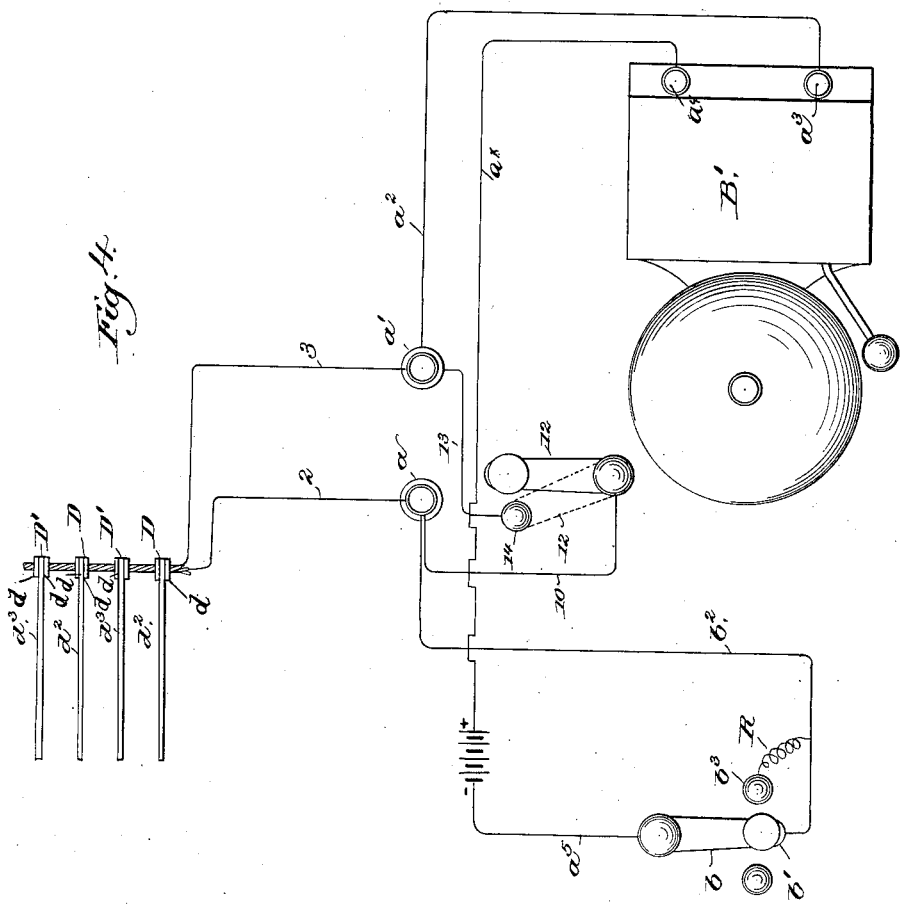

UNITED STATES PATENT OFFICE.

LEMUEL MELLETT, OF MILFORD, MASSACHUSETTS.

ELECTRICAL ORE-DETECTOR.

SPECIFICATION forming part of Letters Patent No. 367,422, dated August 2, 1887.

Application filed March 10, 1887. Serial No. 230,356. (No model.)

*To all whom it may concern:*

Be it known that I, LEMUEL MELLETT, of Milford, county of Worcester, and State of Massachusetts, have invented an Improvement in Electrical Ore-Detectors, of which the following description, in connection with the accompanying drawings is a specification, like letters on the drawings representing like parts.

In another application, Serial No. 196,353, filed by myself and Jerome Prince, March 24, 1886, is shown and described an electrical apparatus adapted for the detection of mineral deposits near the earth's surface, and in a shaft or mine, and also beneath the water.

My present invention is an improvement upon the apparatus shown in the application referred to, and relates more especially to the detection of mineral substances under water, and is especially adapted to be used for dredging harbors and bays for anchors, chains, and like articles pertaining to vessels.

Harbors and bays are now commonly dredged by means of a cable provided with grappling hooks or irons, the said cable being suspended between two tugs or boats at a considerable distance apart, the said grappling hooks or irons engaging chains, anchors, or other objects on the bottom of the bay or harbor as the boats are moved through the water. When a grappling-hook has become engaged with an object on the bottom of the harbor or bay, a diver is sent down to ascertain what the said object is, and as it frequently happens that the said grappling-hook has caught on a rock or ledge of rocks, a considerable delay is thus occasioned. In accordance with my present invention, the cable referred to as suspended between the tugs or boats is composed of wires, two of which are insulated and have their ends connected to the positive and negative poles of a battery to form a positive and negative wire in the cable. The cable referred to is provided at suitable intervals apart throughout its length with metallic collars, preferably brass or other non-corroding metal, every two successive or adjacent collars being in contact with the positive and negative wires of the cable. Each collar has a metallic finger, preferably of copper, which is fitted upon the said collar, so as to be revolved or turned about the said collar as a pivot. The battery to which the positive and negative wires of the cable are connected has in circuit with it a bell to indicate when a positive and negative finger on the cable has come in contact with a metallic substance.

The particular features in which my invention consists will be pointed out in the claims at the end of this specification.

Figure 1 is a top view of a box provided with a bell and battery, to which is connected the positive and negative wires of the cable, the said box being provided with switch-levers, for a purpose to be described. Fig. 2 shows a portion of the cable provided with a positive and negative collar, and finger co-operating therewith; Fig. 3, a section of Fig. 2 on line $x\, x$, to show the manner of establishing the electrical connection between a wire of the cable and the collar; and Fig. 4, a diagram of circuits, to more clearly illustrate my invention.

The box A contains a battery, B, in circuit with which is a bell, B', herein shown in Fig. 1 as secured to the outside of the box, but which in practice will preferably be fastened within the said box. The box A is provided with two binding-posts, $a\, a'$, to which are fastened the positive and negative wires 2 3, respectively, of the cable C, the post $a'$ being shown in Fig. 4 as connected by wire $a^2$ to a post, $a^3$, of the bell B', a post, $a^4$, of said bell being joined to the positive pole of the battery by wire $a^x$. The negative pole of the battery is connected by wire $a^5$ to a switch-lever, $b$, which normally co-operates with a stud or terminal, $b'$, connected by wire $b^2$ (see Fig. 4) to the binding-post $a$, the said switch-lever also co-operating with the stud $b^3$, to which one end of a resistance, R, is connected, the other end of the said resistance being joined to the wire $b^2$. The positive and negative wires 2 3 in practice will be united in a single wire and the ends connected with the cable C.

Referring to Figs. 2 and 3, the cable C is shown as composed of three wires, upon which are mounted at suitable intervals apart metallic collars D D', the third wire, as 5, being employed to give the rounded form to the cable, so that the opening in the said collars may be filled out to thereby maintain the wires 2 3, co-operating with the metallic collars D D', respectively, in contact with the same, that part of the wires encircled by the collars being bare or without insulation—for instance, as shown in Fig. 3, the wire 2 in contact with the collar D, the collar D' in Fig. 2 being in contact with the wire 3. The collars D D' are each provided with flanges d, and between the said flanges the said collars are respectively encircled by metallic fingers $d^2 d^3$, which are free to be revolved or turned about their respective collars.

In the operation of my improved apparatus the cable C is lowered beneath the water until it preferably rests upon the bottom, one end of the said cable being supported on one boat or tug and the other on a second boat or tug, preferably at a considerable distance from the first boat or tug. The cable is dragged over the bottom, and when a positive and negative finger come in contact with an anchor, chain, or other metallic substance, irrespective to whether the said fingers are adjacent or at a considerable distance apart, the circuit of the bell is closed, and notice given by the ringing of the said bell that a metallic substance has been located. A diver can be then sent down, and by a code or a series of prearranged taps or signals on the bell he may inform those on the boat or tug what kind of an article has been found, whether it be an anchor, chain, or bottom of a vessel, or other metallic article.

As shown by full lines, Fig. 4, the apparatus is adapted to be used in fresh water, but when used in salt-water the lever b will be thrown into contact with the stud $b^3$, thereby throwing in circuit the resistance R. The salt-water being a much better conductor of electricity than fresh water, the bell would be affected if the resistance R were not placed in the circuit thereof. I prefer this mode of inserting the resistance, but it is evident that the magnets of the bell may be wound with fine wire to accomplish the same purpose.

In order to test the connections of the apparatus in the box, I have connected the binding-post a by wire 10 with a switch-lever, 12, and have joined the post a' by wire 13 with a stud, 14, with which the lever co-operates to complete a short-circuit for the bell.

In case contact is made between any two fingers, $d^2 d^3$, the circuit, as shown in Fig. 4, may be traced as follows, viz: from the positive pole of the battery through the bell to post a'; thence through finger $d^3$, substance found, finger $d^2$, line 2 to post a; thence by line $b^2$, lever b, and line $a^5$ to the negative pole of the battery.

The short circuit referred to may be traced from the positive poles of the battery through the bell to post a'; thence by wire 13, lever 12, in its dotted-line position, line 10, to post a; thence by line $b^2$, lever b, line $a^5$ to the negative pole of the battery.

I claim—

1. In an electrical indicating apparatus, a box, a battery, and an indicating device in circuit with the battery, combined with a cable having two of its wires connected with the positive and negative pole of the said battery, and with metallic collars on the said cable provided with metallic fingers forming the terminals of the battery-circuit, the said collars being in contact with the positive and negative wires in the cable, substantially as described.

2. In an electrical indicating apparatus, a box, a battery, and a bell in circuit with the battery, combined with a cable having two of its wires connected with the positive and negative pole of the said battery, and with metallic collars on the said cable provided with metallic fingers forming the terminals of the battery-circuit, the said collars being in contact with the positive and negative wires in the cable, substantially as described.

3. In an electrical indicating apparatus, a box, a battery, and a bell in circuit with the said battery, and a cable having two of its wires connected with the positive and negative pole of the said battery, and metallic collars on the said cable provided with metallic fingers forming the terminals of the battery-circuit, the said collars being in contact with the positive and negative wires in the said cable, combined with a resistance, and a switch to interpose or cut out the said resistance, according as the apparatus is to be used in salt or fresh water, substantially as described.

4. The cable C, composed of wires, two of which constitute a positive and negative wire, combined with two metallic collars mounted on said cable, one collar being in contact with the positive wire and the other collar being in contact with the negative wire, and with a metallic finger on each collar, substantially as described.

In testimony whereof I have signed my name to this specification in the presence of two subscribing witnesses.

LEMUEL MELLETT.

Witnesses:
BERNICE J. NOYES,
J. H. CHURCHILL.